US010956077B2

(12) United States Patent
Li et al.

(10) Patent No.: US 10,956,077 B2
(45) Date of Patent: Mar. 23, 2021

(54) DATA ACCESS METHOD, ROUTING APPARATUS, AND STORAGE SYSTEM

(71) Applicant: HUAWEI TECHNOLOGIES CO., LTD., Guangdong (CN)

(72) Inventors: Tianxiang Li, Beijing (CN); Jun Xu, Nanjing (CN); Yuangang Wang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 25 days.

(21) Appl. No.: 16/355,595

(22) Filed: Mar. 15, 2019

(65) Prior Publication Data
US 2019/0212941 A1 Jul. 11, 2019

Related U.S. Application Data

(63) Continuation of application No. PCT/CN2017/101923, filed on Sep. 15, 2017.

(30) Foreign Application Priority Data

Sep. 18, 2016 (CN) .......................... 201610829761.7

(51) Int. Cl.
*G06F 12/00* (2006.01)
*G06F 3/06* (2006.01)
(Continued)

(52) U.S. Cl.
CPC .............. *G06F 3/0649* (2013.01); *G06F 3/06* (2013.01); *G06F 3/064* (2013.01); *G06F 3/067* (2013.01);
(Continued)

(58) Field of Classification Search
CPC ........ G06F 3/0649; G06F 3/06; G06F 3/0616; G06F 3/064; G06F 3/067; G06F 11/1448
See application file for complete search history.

(56) References Cited

U.S. PATENT DOCUMENTS 6,816,945 B2    11/2004  Harris et al.
7,389,393 B1 *   6/2008  Karr ...................... G06F 3/0613
                                                              711/103
(Continued)

FOREIGN PATENT DOCUMENTS

CN          1855880 A       11/2006
CN        102193870 A        9/2011
(Continued)

*Primary Examiner* — Mano Padmanabhan
*Assistant Examiner* — Mohammad S Hasan
(74) *Attorney, Agent, or Firm* — Womble Bond Dickinson (US) LLP

(57) ABSTRACT

A data access method, a routing apparatus, and a storage system are provided. The method is applied to a storage system including a first storage device, a second storage device, and a routing apparatus. A logical unit in each storage device includes at least one first-type logical block and at least one second-type logical block. According to the method, when sending access requests to the storage devices in the storage system according to a preset rule, the routing apparatus sends access requests corresponding to same target logical blocks to one of the storage devices according to a preset rule. This reduces network overheads between the storage system and the application server, and improves efficiency of processing the access requests by the storage system.

10 Claims, 10 Drawing Sheets

(51) Int. Cl.
*H04L 29/08* (2006.01)
*G06F 11/14* (2006.01)

(52) U.S. Cl.
CPC ........ *G06F 3/0616* (2013.01); *G06F 11/1448* (2013.01); *H04L 67/1097* (2013.01); *H04L 67/327* (2013.01)

(56) References Cited

U.S. PATENT DOCUMENTS

| | | | | |
|---|---|---|---|---|
| 8,335,899 | B1* | 12/2012 | Meiri | G06F 11/2076 711/162 |
| 8,745,326 | B2 | 6/2014 | Lubbers et al. | |
| 9,330,048 | B1* | 5/2016 | Bhatnagar | G06F 13/1642 |
| 2009/0049261 | A1 | 2/2009 | Duchesne | |
| 2010/0049902 | A1* | 2/2010 | Kakihara | G06F 12/0873 711/103 |
| 2011/0082950 | A1* | 4/2011 | Mine | G06F 3/061 710/36 |
| 2013/0332612 | A1* | 12/2013 | Cai | H04L 47/70 709/226 |
| 2014/0149625 | A1 | 5/2014 | Sharifie et al. | |
| 2014/0297964 | A1 | 10/2014 | Nakase | |
| 2015/0113317 | A1* | 4/2015 | Ouyang | G06F 11/1464 714/6.3 |
| 2015/0143065 | A1* | 5/2015 | Lu | G06F 3/0619 711/162 |
| 2015/0370660 | A1* | 12/2015 | Pershin | G06F 11/203 714/4.11 |
| 2016/0062858 | A1* | 3/2016 | Gallagher | G06F 11/2097 714/6.23 |
| 2017/0115929 | A1 | 4/2017 | Kalos et al. | |
| 2018/0165168 | A1 | 6/2018 | Chen et al. | |

FOREIGN PATENT DOCUMENTS

| | | |
|---|---|---|
| CN | 103377279 A | 10/2013 |
| CN | 104219085 A | 12/2014 |
| CN | 104246721 A | 12/2014 |
| CN | 104965678 A | 10/2015 |
| CN | 105426275 A | 3/2016 |

* cited by examiner

DATA ACCESS METHOD, ROUTING APPARATUS, AND STORAGE SYSTEM

CROSS-REFERENCE TO RELATED APPLICATIONS

This application is a continuation of International Application No. PCT/CN2017/101923, filed on Sep. 15, 2017, which claims priority to Chinese Patent Application No. 201610829761.7, filed on Sep. 18, 2016. The disclosures of the aforementioned applications are hereby incorporated by reference in their entireties.

TECHNICAL FIELD

Embodiments of the present invention relate to communications technologies, and in particular, to a data access method, a routing apparatus, and a storage system.

BACKGROUND

A multi-active storage system includes at least two storage devices. All the storage devices include a same quantity of logical units. Data stored in same logical units in different storage devices is the same. In other words, data stored on the storage devices has strong consistency. Therefore, the storage devices in the multi-active storage system can simultaneously provide an external service, so that data stored in the multi-active storage system has relatively high availability. At present, the multi-active storage system is widely used in application scenarios in which a plurality of application servers are included and high-concurrent access occurs, such as bank and communication scenarios.

In the prior art, to ensure consistency of data stored on the storage devices in the multi-active storage system, a quorum server is configured in the multi-active storage system. Before sending a write request to the storage device in the multi-active storage system, any application server needs to apply to the quorum server for permission. Only an application server that has gained the permission can send the write request to the storage device in the multi-active storage system. In this manner, the following case can be avoided: Inconsistency of data stored on a plurality of storage devices in the multi-active storage system is caused when a plurality of application servers simultaneously send write requests to same logical units in different storage devices in the multi-active storage system.

However, when the quorum server is used in the multi-active storage system to ensure consistency of data stored on the storage devices, network overheads are relatively high.

SUMMARY

Embodiments of the present invention provide a data access method, a routing apparatus, and a storage system, to resolve a technical problem in the prior art that network overheads are relatively high when a quorum server is used in a multi-active storage system to ensure consistency of data stored on storage devices.

According to a first aspect, an embodiment of the present invention provides a data access method applied to a storage system. The storage system includes a first storage device, a second storage device, and at least one routing apparatus. The second storage device is configured to back up data in the first storage device. Each storage device includes at least one logical unit. Each logical unit includes at least one first-type logical block and at least one second-type logical block. The method includes: sending, by a first routing apparatus of the at least one routing apparatus, a first access request to the first storage device according to a preset rule, where the first access request is used to instruct to perform a write operation on a first target logical block corresponding to a first target logical block identifier, the first target logical block corresponding to the first target logical block identifier is the first-type logical block, and the preset rule is used to instruct the at least one routing apparatus to send an access request for performing a write operation on the first-type logical block to the first storage device and send an access request for performing a write operation on the second-type logical block to the second storage device; and receiving, by the first routing apparatus, an access result that is sent by the first storage device based on the first access request.

According to the data access method provided in the first aspect, when the routing apparatus is an application server, the preset rule is set on each application server, so that when sending access requests to the storage devices in the storage system according to the preset rule, each application server sends access requests corresponding to same target logical blocks to one of the storage devices. The one storage device serially processes a plurality of access requests corresponding to the same target logical blocks. Therefore, when no quorum server is configured in the storage system, and the application server sends the access requests to the storage devices in the storage system according to the preset rule, the following problem can be avoided: When the two storage devices simultaneously process access requests, sent by different application servers, for performing a write operation on same logical blocks, data stored in the same logical blocks in the two storage devices is inconsistent, causing inconsistency of data stored on the two storage devices. This reduces network overheads between the storage system and the application server, and improves efficiency of processing the access requests by the storage system.

In one embodiment, before the sending, by a first routing apparatus of the at least one routing apparatus, a first access request to the first storage device according to a preset rule, the method further includes: receiving, by the first routing apparatus, the preset rule that is sent by the first storage device and/or the second storage device.

In one embodiment, before the sending, by a first routing apparatus of the at least one routing apparatus, a first access request to the first storage device according to a preset rule, the method further includes: obtaining, by the first routing apparatus, a first request, where the first request includes an offset and an offset length of a to-be-accessed logical block in a first logical unit, and the to-be-accessed logical block includes the first target logical block; determining, by the first routing apparatus, the first target logical block identifier based on the first request and a size of a logical block in the first logical unit; and generating, by the first routing apparatus, the first access request based on the first target logical block identifier.

In one embodiment, the preset rule is further used to instruct the at least one routing apparatus to send an access request for performing a read operation on the first-type logical block to the first storage device and send an access request for performing a read operation on the second-type logical block to the second storage device.

In one embodiment, when the routing apparatus is an application server, the preset rule is set on each application server, so that when sending an access request for performing a write operation on a target logical block, any of the at least one application server still sends the access request to the first storage device. The one storage device serially processes a plurality of access requests corresponding to same target logical blocks. Therefore, when no quorum server is configured in the storage system, and the application server sends, according to the preset rule, an access request for performing a read operation on the target logical block to the first storage device in the storage system, accuracy of read data can be ensured. This not only reduces network overheads between the storage system and the application server and improves efficiency of processing the access requests by the storage system, but also improves accuracy of processing the access request by the storage system.

In one embodiment, the method further includes: receiving, by the first routing apparatus, a new preset rule that is sent by the first storage device after the second storage device is faulty. The new preset rule is used to instruct the at least one routing apparatus to send, to the first storage device, an access request for performing a write operation or a read operation on the first-type logical block and an access request for performing a write operation or a read operation on the second-type logical block.

In one embodiment, when the routing apparatus is an application server, after receiving the new preset rule that is sent by the first storage device after the second storage device is faulty, any of the at least one application server (including the first application server) may send an access request to the first storage device in the storage system according to the new preset rule. This improves efficiency of processing the access request by the storage system.

According to a second aspect, an embodiment of the present invention provides a data access method applied to a storage system. The storage system includes a first storage device, a second storage device, and at least one routing apparatus. The second storage device is configured to back up data in the first storage device. Each storage device includes at least one logical unit. Each logical unit includes at least one first-type logical block and at least one second-type logical block. The method includes: receiving, by the first storage device, a first access request that is sent by the first routing apparatus of the at least one routing apparatus according to a preset rule, where the first access request is used to instruct to perform a write operation on a first target logical block corresponding to a first target logical block identifier, the first target logical block corresponding to the first target logical block identifier is the first-type logical block, and the preset rule is used to instruct the at least one routing apparatus to send an access request for performing a write operation on the first-type logical block to the first storage device and send an access request for performing a write operation on the second-type logical block to the second storage device; and based on the first access request, performing, by the first storage device, an access operation on the first target logical block, corresponding to the first target logical block identifier, in the first storage device, and instructing the second storage device to perform an access operation on a first target logical block, corresponding to the first target logical block identifier, in the second storage device.

In one embodiment, before the receiving, by the first storage device, a first access request that is sent by the first routing apparatus of the at least one routing apparatus according to a preset rule, the method further includes: broadcasting, by the first storage device, the preset rule to the at least one routing apparatus.

In one embodiment, the preset rule is further used to instruct the at least one routing apparatus to send an access request for performing a read operation on the first-type logical block to the first storage device and send an access request for performing a read operation on the second-type logical block to the second storage device.

In one embodiment, the method further includes: determining, by the first storage device, that the second storage device is faulty; obtaining, by the first storage device, a new preset rule, where the new preset rule is used to instruct the at least one routing apparatus to send, to the first storage device, an access request for performing a write operation or a read operation on the first-type logical block and an access request for performing a write operation or a read operation on the second-type logical block; and broadcasting, by the first storage device, the new preset rule to the at least one routing apparatus.

The data access method provided in the second aspect and the embodiments of the second aspect and the data access method provided in the first aspect and the embodiments of the first aspect are based on a same inventive concept. Therefore, for beneficial effects of the data access method provided in the second aspect and the embodiments of the second aspect, refer to the beneficial effects brought by the first aspect and the embodiments of the first aspect. Details are not described herein again.

According to a third aspect, an embodiment of the present invention provides a data access method applied to a storage system. The storage system includes a first storage device, a second storage device, and at least one routing apparatus. The first storage device and the second storage device are in a mutual backup relationship. Each storage device includes at least one logical unit. Each logical unit includes at least one first-type logical block and at least one second-type logical block. The method includes: sending, by a first routing apparatus of the at least one routing apparatus, a first access request to the first storage device and a second access request to the second storage device according to a preset rule, where the first access request carries a first target logical block identifier, a first target logical block corresponding to the first target logical block identifier is the first-type logical block, the second access request carries a second target logical block identifier, a second target logical block corresponding to the second target logical block identifier is the second-type logical block, and the preset rule is used to instruct the at least one routing apparatus to send an access request for performing a write operation or a read operation on the first-type logical block to the first storage device and send an access request for performing a write operation or a read operation on the second-type logical block to the second storage device; performing, by the first storage device based on the first access request, an access operation on the first target logical block, corresponding to the first target logical block identifier, in the first storage device; and performing, by the second storage device based on the second access request, an access operation on the second target logical block, corresponding to the second target logical block identifier, in the second storage device. The first target logical block corresponding to the first target logical block identifier and the second target logical block corresponding to the second target logical block identifier belong to a same logical unit.

In one embodiment, before the sending, by a first routing apparatus of the at least one routing apparatus, a first access request to the first storage device and a second access request to the second storage device according to a preset rule, the method further includes: receiving, by the first routing apparatus, the preset rule that is sent by the first storage device and/or the second storage device.

In one embodiment, before the sending, by a first routing apparatus, a first access request to the first storage device and a second access request to the second storage device according to a preset rule, the method further includes: obtaining, by the first routing apparatus, a first request, where the first request includes an offset and an offset length of a to-be-accessed logical block in a first logical unit, and the to-be-accessed logical block includes the first target logical block and the second target logical block; determining, by the first routing apparatus, the first target logical block identifier and the second target logical block identifier based on the first request and a size of a logical block in the first logical unit; and generating, by the first routing apparatus, the first access request based on the first target logical block identifier and the second access request based on the second target logical block identifier.

In one embodiment, the method further includes: receiving, by the first routing apparatus, an access result that is sent by the first storage device based on the first access request and an access result that is sent by the second storage device based on the second access request; and determining, by the first routing apparatus, an access result of the first request based on the access result corresponding to the first access request and the access result corresponding to the second access request.

In one embodiment, the method further includes: receiving, by the first routing apparatus, a new preset rule that is sent by the first storage device after the second storage device is faulty. The new preset rule is used to instruct the at least one routing apparatus to send, to the first storage device, an access request for performing a write operation or a read operation on the first-type logical block and an access request for performing a write operation or a read operation on the second-type logical block.

The data access method provided in the third aspect and the embodiments of the third aspect and the data access method provided in the first aspect and the embodiments of the first aspect are based on a same inventive concept. Therefore, for beneficial effects of the data access method provided in the third aspect and the embodiments of the third aspect, refer to the beneficial effects brought by the first aspect and the embodiments of the first aspect. Details are not described herein again.

According to a fourth aspect, an embodiment of the present invention provides a routing apparatus applied to a storage system. The storage system includes a first storage device, a second storage device, and at least one routing apparatus. The routing apparatus is a first routing apparatus of the at least one routing apparatus. The second storage device is configured to back up data in the first storage device. Each storage device includes at least one logical unit. Each logical unit includes at least one first-type logical block and at least one second-type logical block. The first routing apparatus includes: a sending module, configured to send a first access request to the first storage device according to a preset rule, where the first access request is used to instruct to perform a write operation on a first target logical block corresponding to a first target logical block identifier, the first target logical block corresponding to the first target logical block identifier is the first-type logical block, and the preset rule is used to instruct the at least one routing apparatus to send an access request for performing a write operation on the first-type logical block to the first storage device and send an access request for performing a write operation on the second-type logical block to the second storage device; and a receiving module, configured to receive an access result that is sent by the first storage device based on the first access request.

In one embodiment, the receiving module is further configured to: before the sending module sends the first access request to the first storage device according to the preset rule, receive the preset rule that is sent by the first storage device and/or the second storage device.

In one embodiment, the routing apparatus further includes a processing module, configured to: before the sending module sends the first access request to the first storage device according to the preset rule, obtain a first request; determine the first target logical block identifier based on the first request and a size of a logical block in a first logical unit; and generate the first access request based on the first target logical block identifier. The first request includes an offset and an offset length of a to-be-accessed logical block in the first logical unit, and the to-be-accessed logical block includes the first target logical block.

In one embodiment, the preset rule is further used to instruct the at least one routing apparatus to send an access request for performing a read operation on the first-type logical block to the first storage device and send an access request for performing a read operation on the second-type logical block to the second storage device.

In one embodiment, the receiving module is further configured to receive a new preset rule that is sent by the first storage device after the second storage device is faulty. The new preset rule is used to instruct the at least one routing apparatus to send, to the first storage device, an access request for performing a write operation or a read operation on the first-type logical block and an access request for performing a write operation or a read operation on the second-type logical block.

Based on a same inventive concept, for a problem-resolving principle and beneficial effects of the routing apparatus, refer to the first aspect and the possible data access method implementations of the first aspect and the brought beneficial effects. Therefore, for implementations of the routing apparatus, refer to the method implementations. Details are not described herein again.

According to a fifth aspect, an embodiment of the present invention provides a storage device applied to a storage system. The storage device is a first storage device. The storage system includes the first storage device, a second storage device, and at least one routing apparatus. The second storage device is configured to back up data in the first storage device. Each storage device includes at least one logical unit. Each logical unit includes at least one first-type logical block and at least one second-type logical block. The first storage device includes: a receiving module, configured to receive a first access request that is sent by a first routing apparatus of the at least one routing apparatus according to a preset rule, where the first access request is used to instruct to perform a write operation on a first target logical block corresponding to a first target logical block identifier, the first target logical block corresponding to the first target logical block identifier is the first-type logical block, and the preset rule is used to instruct the at least one routing apparatus to send an access request for performing a write operation on the first-type logical block to the first storage device and send an access request for performing a write operation on the second-type logical block to the second storage device; and a processing module, configured to: based on the first access request, perform an access operation on the first target logical block, corresponding to the first target logical block identifier, in the first storage device, and instruct the second storage device to perform an access operation on a first target logical block, corresponding to the first target logical block identifier, in the second storage device.

In one embodiment, the storage device further includes a sending module, configured to: before the receiving module receives the first access request that is sent by the first routing apparatus of the at least one routing apparatus according to the preset rule, broadcast the preset rule to the at least one routing apparatus.

In one embodiment, the preset rule is further used to instruct the at least one routing apparatus to send an access request for performing a read operation on the first-type logical block to the first storage device and send an access request for performing a read operation on the second-type logical block to the second storage device.

In one embodiment, the processing module is further configured to determine that the second storage device is faulty, and obtain a new preset rule, where the new preset rule is used to instruct the at least one routing apparatus to send, to the first storage device, an access request for performing a write operation or a read operation on the first-type logical block and an access request for performing a write operation or a read operation on the second-type logical block; and the sending module is further configured to broadcast the new preset rule to the at least one routing apparatus.

Based on a same inventive concept, for a problem-resolving principle and beneficial effects of the storage device, refer to the first aspect and the possible data access method implementations of the first aspect and the brought beneficial effects. Therefore, for implementations of the storage device, refer to the method implementations. Details are not described herein again.

According to a sixth aspect, an embodiment of the present invention provides a storage system. The storage system includes a first storage device, a second storage device, and at least one routing apparatus. The at least one routing apparatus includes a first routing apparatus. The first storage device and the second storage device are in a mutual backup relationship. Each storage device includes at least one logical unit. Each logical unit includes at least one first-type logical block and at least one second-type logical block. The first routing apparatus is configured to send a first access request to the first storage device and a second access request to the second storage device according to a preset rule. The first access request carries a first target logical block identifier, and a first target logical block corresponding to the first target logical block identifier is the first-type logical block. The second access request carries a second target logical block identifier, and a second target logical block corresponding to the second target logical block identifier is the second-type logical block. The preset rule is used to instruct the at least one routing apparatus to send an access request for performing a write operation or a read operation on the first-type logical block to the first storage device and send an access request for performing a write operation or a read operation on the second-type logical block to the second storage device. The first storage device is configured to perform, based on the first access request, an access operation on the first target logical block, corresponding to the first target logical block identifier, in the first storage device. The second storage device is configured to perform, based on the second access request, an access operation on the second target logical block, corresponding to the second target logical block identifier, in the second storage device. The first target logical block corresponding to the first target logical block identifier and the second target logical block corresponding to the second target logical block identifier belong to a same logical unit.

In one embodiment, the first routing apparatus is further configured to: before sending the first access request to the first storage device and the second access request to the second storage device according to the preset rule, receive the preset rule that is sent by the first storage device and/or the second storage device.

In one embodiment, the first routing apparatus is further configured to: before sending the first access request to the first storage device and the second access request to the second storage device according to the preset rule, obtain a first request; determine the first target logical block identifier and the second target logical block identifier based on the first request and a size of a logical block in a first logical unit; and generate the first access request based on the first target logical block identifier and the second access request based on the second target logical block identifier. The first request includes an offset and an offset length of a to-be-accessed logical block in the first logical unit, and the to-be-accessed logical block includes the first target logical block and the second target logical block.

In one embodiment, the first routing apparatus is further configured to: receive an access result that is sent by the first storage device based on the first access request and an access result that is sent by the second storage device based on the second access request; and determine an access result of the first request based on the access result corresponding to the first access request and the access result corresponding to the second access request.

In one embodiment, the first routing apparatus is further configured to receive a new preset rule that is sent by the first storage device after the second storage device is faulty. The new preset rule is used to instruct the at least one routing apparatus to send, to the first storage device, an access request for performing a write operation or a read operation on the first-type logical block and an access request for performing a write operation or a read operation on the second-type logical block.

Based on a same inventive concept, for a problem-resolving principle and beneficial effects of the storage system, refer to the first aspect and the possible data access method implementations of the first aspect and the brought beneficial effects. Therefore, for implementations of the storage system, refer to the method implementations. Details are not described herein again.

According to the data access method, the routing apparatus, and the storage system provided in the embodiments of the present invention, when the routing apparatus is an application server, the preset rule is set on each application server, so that when sending access requests to the storage devices in the storage system according to the preset rule, each application server sends access requests corresponding to same target logical blocks to one of the storage devices. The one storage device serially processes a plurality of access requests corresponding to the same target logical blocks. Therefore, when no quorum server is configured in the storage system, and the application server sends the access requests to the storage devices in the storage system according to the preset rule, the following problem can be avoided: When the two storage devices simultaneously process access requests, sent by different application servers, for performing a write operation on same logical blocks, data stored in the same logical blocks in the two storage devices is inconsistent, causing inconsistency of data stored on the two storage devices. This reduces network overheads between the storage system and the application server, and improves efficiency of processing the access requests by the storage system.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention.

It should be understood that, although terms "first" and "second" are used in the embodiments of the present invention to describe storage devices, these storage devices are not limited by the terms. These terms are merely used to differentiate the storage devices. For example, without departing from the scope of the embodiments of the present invention, a first storage device may also be referred to as a second storage device, and likewise, the second storage device may also be referred to as the first storage device.

A method provided in the embodiments of the present invention is applicable to any storage system including at least two storage devices in a mutual backup relationship, such as a dual-active storage system and a multi-active storage system. The storage devices in the storage system can provide access (read or write) services to different application servers simultaneously. Each storage device includes at least one logical unit (LU). Each LU is corresponding to one logical unit number (LUN). All the storage devices in the storage system include a same quantity of LUs, and data stored in LUs corresponding to a same LUN in the storage devices is the same. The application server may be any server capable of accessing the storage system.

Figure 1:
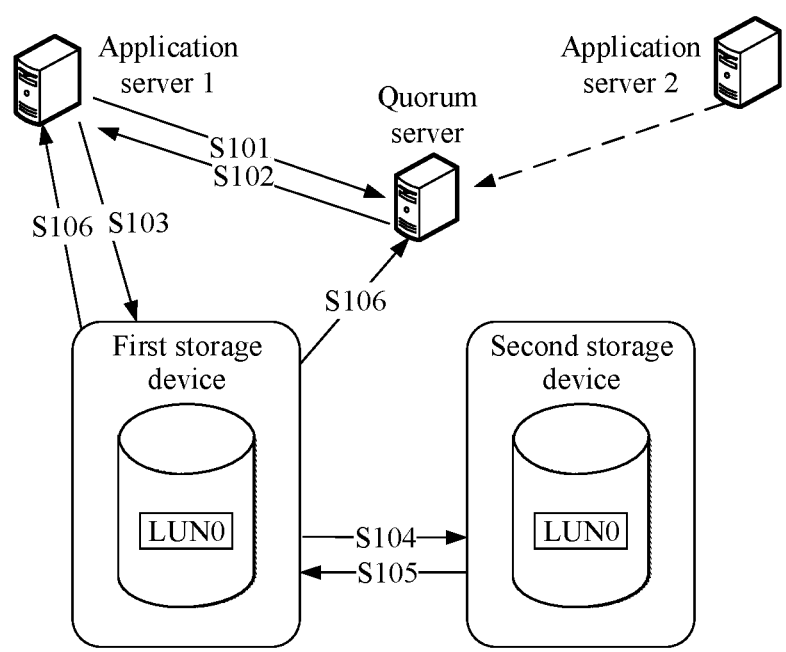
FIG. 1 is a diagram of an application scenario of an existing storage system.

For ease of understanding the embodiments of the present invention, the following application document uses an example in which the storage system includes two storage devices (that is, a first storage device and a second storage device) to implement description. FIG. 1 is a diagram of an application scenario of an existing storage system. As shown in FIG. 1, in addition to a first storage device and a second storage device, the existing storage system further includes a quorum server that grants permission to an application server. Before accessing an LU corresponding to a LUN, any application server needs to apply to the quorum server for access permission. After being granted the access permission, the application server may send an access request to a storage device closest to the application server.

An application server 1 is used as an example. Assuming that an access request sent by the application server 1 is a LUN0 write request, the access procedure may be specifically as follows.

Operation S101. The application server 1 sends the LUN0 access request to the quorum server.

Operation S102. The quorum server sends a response message to the application server 1, to indicate that the application server 1 has obtained LUN0 access permission.

Operation S103. The application server 1 sends the LUN0 access request to the first storage device in the storage system.

Specifically, after receiving the response message sent by the quorum server, the application server 1 may send the LUN0 access request, namely, a LUN0 write request, to a storage device closest to the application server 1 in the storage system (in this example, the storage device is the first storage device).

Operation S104. The first storage device performs an access operation on a LUN0 in the first storage device based on the access request, and forwards the access request to the second storage device.

In one embodiment, after receiving the access request sent by the application server 1, the first storage device may perform, based on the access request, a write operation on an LU corresponding to the LUN0 in the first storage device. In addition, to ensure consistency of data stored on the storage devices in the storage system, that is, to ensure consistency of data stored on the first storage device and the second storage device, the first storage device may further forward the access request to the second storage device, so that the second storage device also performs, based on the access request, a write operation on an LU corresponding to a LUN0 in the second storage device. This ensures consistency of data stored the LU corresponding to the LUN0 in the first storage device and the LU corresponding to the LUN0 in the second storage device.

Operation S105. The second storage device performs, based on the access request, an access operation on a LUN0 in the second storage device, and returns an access result to the first storage device.

Specifically, after performing, based on the access request, the write operation on the LU corresponding to the LUN0 in the second storage device, the second storage device may return a write result corresponding to the write operation (that is, an access result) to the first storage device, so that the first storage device learns, based on the access result, whether the second storage device has completed the write operation performed on the LU corresponding to the LUN0.

Operation S106. Based on an access result of the first storage device and the access result sent by the second storage device, the first storage device sends a response message to the application server 1 and sends a response message to the quorum server.

Specifically, after completing the write operation performed on the LU corresponding to the LUN0 in the first storage device, the first storage device may obtain a write result corresponding to the write operation (that is, the access result), so that the first storage device may determine, based on the access result of the first storage device and the access result sent by the second storage device, whether both the first storage device and the second storage device have completed the write operation performed on the LU corresponding to the LUN0. If both the first storage device and the second storage device have completed the write operation performed on the LU corresponding to the LUN0, the first storage device sends, to the application server 1, a response message indicating that the write operation succeeds; if either the first storage device or the second storage device has not completed the write operation performed on the LU corresponding to the LUN0, the first storage device sends, to the application server 1, a response message indicating that the write operation fails. In addition, the first storage device may further send a response message to the quorum server, to indicate that the quorum server can grant permission to a next storage device that sends a LUN0 access request.

In the manner of configuring the quorum server, when the application server 1 sends the LUN0 access request to the first storage device, the following case can be avoided: Another application server (for example, an application server 2) sends a LUN0 write or read request to the second storage device, causing inconsistency of data stored in the LUs corresponding to the LUN0 in the first storage device and the second storage device. However, in the entire procedure, the application server 1 needs to interact with the quorum server to obtain access permission. Consequently, network overheads are relatively high, and an actual use requirement cannot be met.

Figure 2A:
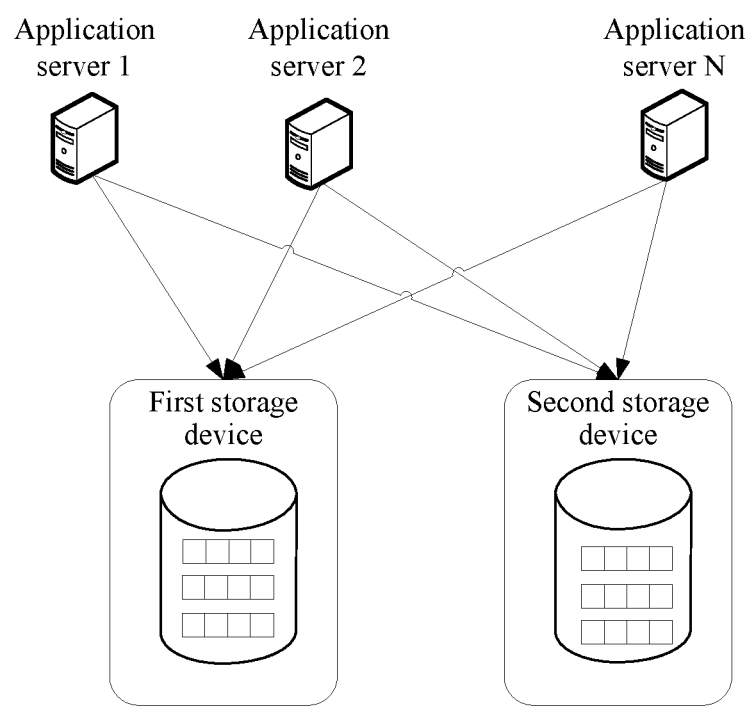
FIG. 2A is a storage system according to an embodiment of the present invention.

FIG. 2A is a storage system according to an embodiment of the present invention. As shown in FIG. 2A, in this embodiment, the storage system includes a first storage device and a second storage device that are in a mutual backup relationship, and at least one routing apparatus including a first routing apparatus. Each storage device includes at least one LU. Each LU includes a plurality of logical blocks. The plurality of logical blocks may have a same size or different sizes, and a size of the logical block may be specifically set depending on a user's requirement. FIG. 2A shows a storage system in which each storage device includes three LUs and each LU includes four logical blocks with a same size. The plurality of logical blocks are classified into different types of logical blocks, and a quantity of the different types of logical blocks are specifically in a one-to-one correspondence with a quantity of storage devices included in the storage system. Corresponding to this embodiment, each of the plurality of logical blocks is classified into a first-type logical block or a second-type logical block. In other words, each LU includes at least one first-type logical block and at least one second-type logical block. Each of the at least one routing apparatus may be a single router or may be an application server into which a routing module is integrated (the routing module may be implemented in, for example, a volume manager of the application server). FIG. 2A shows an example of a storage system in which the routing apparatus is an application server into which a routing module is integrated. The following application document uses the example in which the routing apparatus is the application server to implement description.

Division of the first-type logical block and the second-type logical block may be set depending on a user's requirement. For example, the first-type logical block and the second-type logical block may be logical blocks obtained through division based on types of stored data, or may be logical blocks obtained through division based on logical block numbers. For example, the first-type logical block and the second-type logical block are logical blocks obtained through division based on logical block numbers. The first-type logical block may be an odd-numbered logical block, and the second-type logical block may be an even-numbered logical block; or the first-type logical block is an even-numbered logical block, and the second-type logical block is an odd-numbered logical block; or the first-type logical block is a logical block with a logical block number less than a preset number, and the second-type logical block is a logical block with a logical block number greater than or equal to the preset number; or the first-type logical block is a logical block with a logical block number greater than or equal to a preset number, and the second-type logical block is a logical block with a logical block number less than the preset number.

As shown in FIG. 2A, in this embodiment, no quorum server is configured in the storage system. Instead, a preset rule is set on each of at least one application server, to replace a function of a quorum server. The preset rule may be a rule that is set in each application server, or may be a preset rule that is broadcast by the first storage device and/or the second storage device in the storage system and that is received during initialization of the application server. The preset rule is used to instruct all the application servers to send an access request for performing a write operation on the first-type logical block to the first storage device and send an access request for performing a write operation on the second-type logical block to the second storage device. According to the preset rule, all the application servers may send all access requests corresponding to the first-type logical block to the first storage device and send all access requests corresponding to the second-type logical block to the second storage device. In other words, when sending access requests to the storage devices in the storage system according to the preset rule, each application server sends access requests corresponding to same target logical blocks to one of the storage devices, and the storage device is responsible for synchronizing data in another storage device in the storage system.

When one storage device receives access requests, corresponding to a same logical block, sent by a plurality of application servers, the storage device sequentially processes, based on time at which the storage device receives the access requests, the access requests corresponding to the same logical block. Therefore, when no quorum server is configured in the storage system, and the application server sends the access requests to the storage devices in the storage system according to the preset rule, the following problem can be avoided: When the two storage devices simultaneously process access requests, sent by different application servers, for performing a write operation on same logical blocks, data stored in the same logical blocks in the two storage devices is inconsistent, causing inconsistency of data stored on the two storage devices. This reduces network overheads between the storage system and the application server, and improves efficiency of processing the access requests by the storage system. Therefore, the data access method provided in this embodiment of the present invention is to resolve a technical problem that network overheads are relatively high when a quorum server is used in a multi-active storage system to ensure consistency of data stored on storage devices.

The following uses specific embodiments to describe in detail the technical solutions of the present invention and how the foregoing technical problem is resolved by using the technical solutions of the present invention. The following several specific embodiments may be mutually combined, and same or similar concepts or processes may not be described in some embodiments.

Figure 2B:
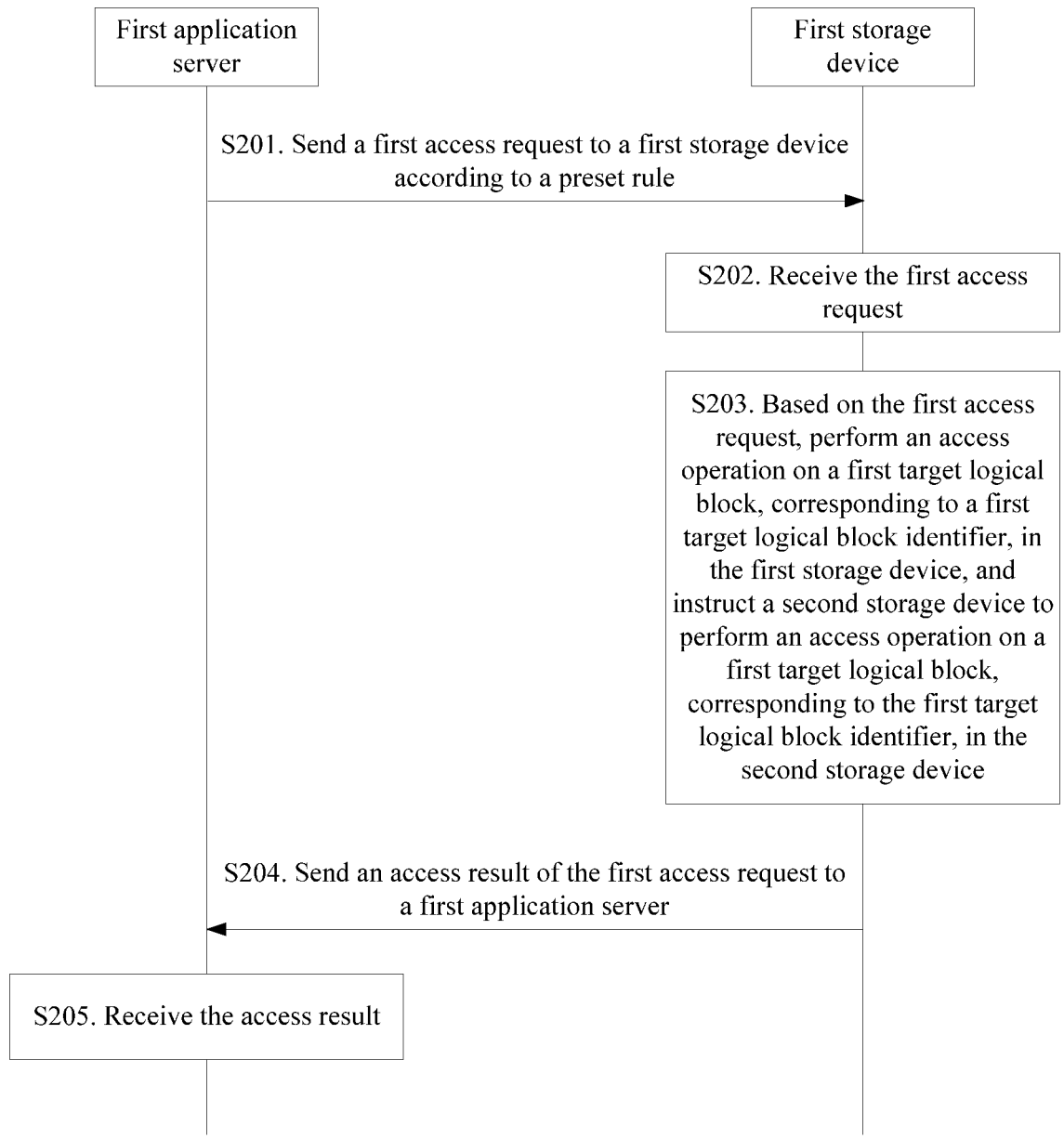
FIG. 2B is a signaling flowchart of a data access method according to an embodiment of the present invention.

FIG. 2B is a signaling flowchart of a data access method according to an embodiment of the present invention. This embodiment relates to a specific process in which a first application server sends a first access request to a first storage device according to a preset rule. As shown in FIG. 2B, the method may include the following operations.

Operation S201. The first application server sends the first access request to the first storage device according to the preset rule.

The first access request is used to instruct to perform a write operation on a first target logical block corresponding to a first target logical block identifier. The first target logical block corresponding to the first target logical block identifier is a first-type logical block. The first target logical block herein may be one logical block or a plurality of logical blocks, being first-type logical blocks, in a same logical unit.

In this embodiment, the first access request may carry the first target logical block identifier. Therefore, when the first application server of at least one application server needs to send the first access request, the first application server may determine, based on the first target logical block identifier carried in the first access request, whether the first target logical block corresponding to the first target logical block identifier is the first-type logical block or a second-type logical block. If determining that the first target logical block corresponding to the first target logical block identifier is the first-type logical block, the first application server may send the first access request to the first storage device in a storage system according to the preset rule. If determining that the first target logical block corresponding to the first target logical block identifier is the second-type logical block, the first application server may send the first access request to a second storage device in the storage system according to the preset rule. In this example, the first target logical block corresponding to the first target logical block identifier is the first-type logical block. Therefore, the first application server may send the first access request to the first storage device. The first target logical block identifier may be any identifier that can be used to identify the first target logical block. For example, the first target logical block identifier may be a first target logical block number, or may be an offset of the first target logical block in a logical unit in which the first target logical block is located.

Operation S202. The first storage device receives the first access request.

Operation S203. Based on the first access request, the first storage device performs an access operation on the first target logical block, corresponding to the first target logical block identifier, in the first storage device, and instructs a second storage device to perform an access operation on a first target logical block, corresponding to the first target logical block identifier, in the second storage device.

In this embodiment, the first access request is used to instruct to perform a write operation on the first target logical block corresponding to the first target logical block identifier, that is, the first access request is a write request. Therefore, in addition to the first target logical block identifier, the first access request may further carry to-be-written data. In this way, after the first storage device receives the first access request sent by the first application server, the first storage device may write, based on the first target logical block identifier and the to-be-written data carried in the first access request, the to-be-written data into the first target logical block, corresponding to the first target logical block identifier, in the first storage device, that is, perform the access operation on the first target logical block, corresponding to the first target logical block identifier, in the first storage device.

Accordingly, to ensure consistency of data stored on the first storage device and the second storage device, the first storage device may further instruct the second storage device to perform the access operation on the first target logical block, corresponding to the first target logical block identifier, in the second storage device. During specific implementation, after writing the to-be-written data into the first target logical block, corresponding to the first target logical block identifier, in the first storage device, the first storage device may send, to the second storage device, final data stored in the first target logical block, to instruct the second storage device to use the final data to replace data in the first target logical block, corresponding to the first target logical block identifier, in the second storage device, that is, perform the access operation on the first target logical block, corresponding to the first target logical block identifier, in the second storage device, so as to ensure that data in the first target logical block, corresponding to the first target logical block identifier, in the first storage device is the same as data in the first target logical block, corresponding to the first target logical block identifier, in the second storage device. In one embodiment, the first storage device may directly send, to the second storage device, the first access request received by the first storage device, so that the second storage device may perform, based on the first access request, the access operation on the first target logical block, corresponding to the first target logical block identifier, in the second storage device, so as to ensure that data in the first target logical block, corresponding to the first target logical block identifier, in the first storage device is the same as data in the first target logical block, corresponding to the first target logical block identifier, in the second storage device.

Operation S204. The first storage device sends an access result of the first access request to the first application server.

In one embodiment, after based on the first access request, the first storage device performs the access operation on the first target logical block, corresponding to the first target logical block identifier, in the first storage device, and instructs the second storage device to perform the access operation on the first target logical block, corresponding to the first target logical block identifier, in the second storage device, the first storage device may obtain a write result of the first storage device, and receive a write result sent by the second storage device. The write result of the first storage device is used to indicate whether the first storage device has completed the write operation performed on the first target logical block, and the write result sent by the second storage device is used to indicate whether the second storage device has completed a write operation performed on the first target logical block in the second storage device.

If both the write results indicate that the write operations performed on the first target logical blocks have been completed, the first storage device sends, to the first application server, an access result indicating that the access succeeds, so that the first application server may learn, based on the access result, that the first access request has been processed successfully. If either of or both the write results indicate that the write operations performed on the first target logical blocks have not been completed, the first storage device sends, to the first application server, an access result indicating that the access fails, so that the first application server may learn, based on the access result, that the first access request has been processed unsuccessfully, and further the first application server may determine whether to resend a first access request.

Operation S205. The first application server receives the access result.

By the time, the storage system has completed processing the first access request sent by the first application server.

According to the data access method provided in this embodiment of the present invention, the preset rule is set on each application server, so that when sending access requests to the storage devices in the storage system according to the preset rule, each application server sends access requests corresponding to same target logical blocks to one of the storage devices. The one storage device serially processes a plurality of access requests corresponding to the same target logical blocks. Therefore, when no quorum server is configured in the storage system, and the application server sends the access requests to the storage devices in the storage system according to the preset rule, the following problem can be avoided: When the two storage devices simultaneously process access requests, sent by different application servers, for performing a write operation on same logical blocks, data stored in the same logical blocks in the two storage devices is inconsistent, causing inconsistency of data stored on the two storage devices. This reduces network overheads between the storage system and the application server, and improves efficiency of processing the access requests by the storage system.

Figure 3:
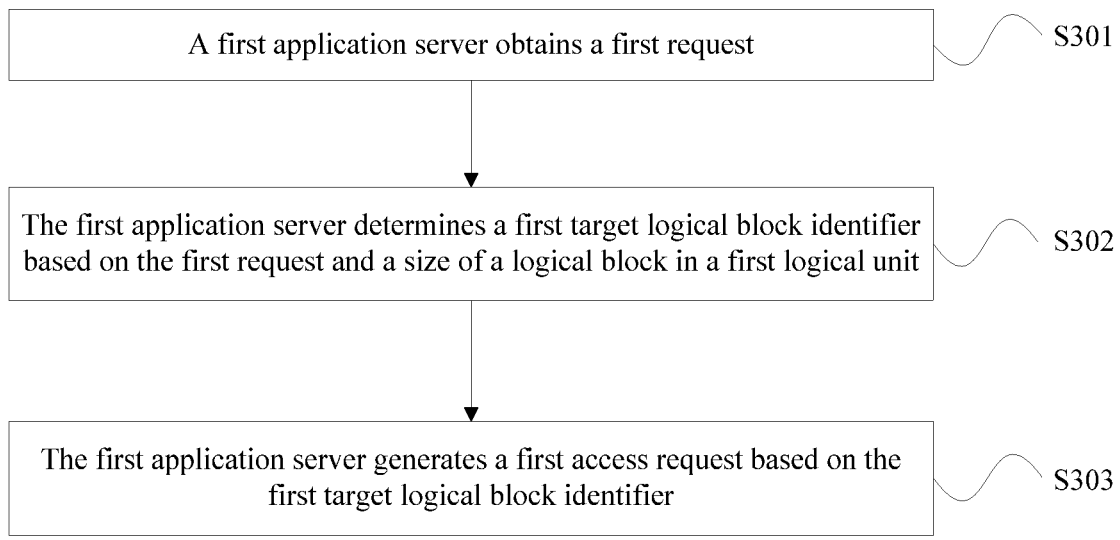
FIG. 3 is a schematic flowchart of another data access method according to an embodiment of the present invention.

FIG. 3 is a schematic flowchart of another data access method according to an embodiment of the present invention. For example, the first-type logical block and the second-type logical block are logical blocks obtained through division based on logical block numbers. This embodiment relates to a specific process of generating a first access request by the first application server. Further, based on the foregoing embodiment, as shown in FIG. 3, before S201, the method may further include the following operations.

Operation S301. The first application server obtains a first request.

Specifically, in the prior art, the first application server, serving as an interface between a terminal device and a storage system, is configured to forward, to storage devices in the storage system, an access request that is sent by the terminal device. Therefore, in this embodiment, before the first application server needs to send the first access request, the first application server may generate the first request based on an access request, corresponding to a to-be-accessed logical block, that is sent by the terminal device and that is received by the first application server. Both the access request that is sent by the terminal device and the first request that is generated by the first application server may include an offset and an offset length of the to-be-accessed logical block in a first logical unit. The to-be-accessed logical block may include one logical block or a plurality of adjacent logical blocks in the first logical unit, and the one logical block or the plurality of adjacent logical blocks includes/include a first target logical block.

Operation S302. The first application server determines a first target logical block identifier based on the first request and a size of a logical block in a first logical unit.

In one embodiment, the first target logical block identifier may be any identifier that can be used to uniquely identify the first target logical block, for example, a number of the first target logical block. For example, the first target logical block identifier is the number of the first target logical block. The first application server may divide the offset of the to-be-accessed logical block in the first logical unit carried in the first request by a preset size of the logical block in the first logical unit, to determine a sequence number, of a 1st logical block in the to-be-accessed logical block, in the first logical unit, and further use the sequence number as a number of the 1st logical block in the to-be-accessed logical block. In addition, the first application server divides "a sum of the offset and the offset length of the to-be-accessed logical block in the first logical unit" by the preset size of the logical block in the first logical unit, to determine a sequence number, of a last logical block of the to-be-accessed logical block, in the first logical unit, and further use the sequence number as a number of the last logical block in the to-be-accessed logical block.

Because logical blocks in the to-be-accessed logical block are adjacent logical blocks, after obtaining the numbers of the 1st logical block and the last logical block in the to-be-accessed logical block, the first application server may obtain numbers of all the logical blocks in the to-be-accessed logical block based on the numbers of the 1st logical block and the last logical block. In this way, the first application server may determine, based on the numbers of the logical blocks in the to-be-accessed logical block and the division manner of the first-type logical block and the second-type logical block, that logical blocks corresponding to which logical block numbers in the to-be-accessed logical block are first-type logical blocks, and determine the logical block numbers as first target logical block identifiers.

It should be noted that, if the to-be-accessed logical block includes one logical block, the numbers of the 1st logical block and the last logical block in the to-be-accessed logical block that are obtained by the first application server are the same.

Operation S303. The first application server generates the first access request based on the first target logical block identifier.

In one embodiment, after determining the first target logical block identifier, the first application server may generate, based on the first target logical block identifier, the first access request corresponding to the first target logical block corresponding to the first target logical block identifier, and further the first application server may determine, based on the first access request and a preset rule, to send the first access request to the first storage device in the storage system. Optionally, the first access request may further carry the offset and the offset length of the first target logical block in the first logical unit.

According to the data access method provided in this embodiment of the present invention, the preset rule is set on each application server, so that when sending access requests to the storage devices in the storage system according to the preset rule, each application server sends access requests corresponding to same target logical blocks to one of the storage devices. The one storage device serially processes a plurality of access requests corresponding to the same target logical blocks. Therefore, when no quorum server is configured in the storage system, and the application server sends the access requests to the storage devices in the storage system according to the preset rule, the following problem can be avoided: When the two storage devices simultaneously process access requests, sent by different application servers, for performing a write operation on same logical blocks, data stored in the same logical blocks in the two storage devices is inconsistent, causing inconsistency of data stored on the two storage devices. This reduces network overheads between the storage system and the application server, and improves efficiency of processing the access requests by the storage system.

As described in the embodiment, the preset rule set on each of at least one application server is used to instruct the at least one application server to send an access request for performing a write operation on the first-type logical block to the first storage device and send an access request for performing a write operation on the second-type logical block to the second storage device. Further, to avoid the following problem: When the first storage device performs, based on the first access request, the access operation on the first target logical block, corresponding to the first target logical block identifier, in the first storage device, another application server sends an access request for performing a read operation on a first target logical block to the second storage device in the storage system, causing a problem that data obtained by the another application server is inaccurate. The preset rule may be further used to instruct the at least one application server to send an access request for performing a read operation on the first-type logical block to the first storage device and send an access request for performing a read operation on the second-type logical block to the second storage device.

In the foregoing manner, when sending an access request for performing a write operation on a target logical block, any of the at least one application server still sends the access request to the first storage device. The one storage device serially processes a plurality of access requests corresponding to same target logical blocks. Therefore, when no quorum server is configured in the storage system, and the application server sends, according to the preset rule, an access request for performing a read operation on the target logical block to the first storage device in the storage system, accuracy of read data can be ensured. This not only reduces network overheads between the storage system and the application server and improves efficiency of processing the access requests by the storage system, but also improves accuracy of processing the access request by the storage system.

Figure 4:
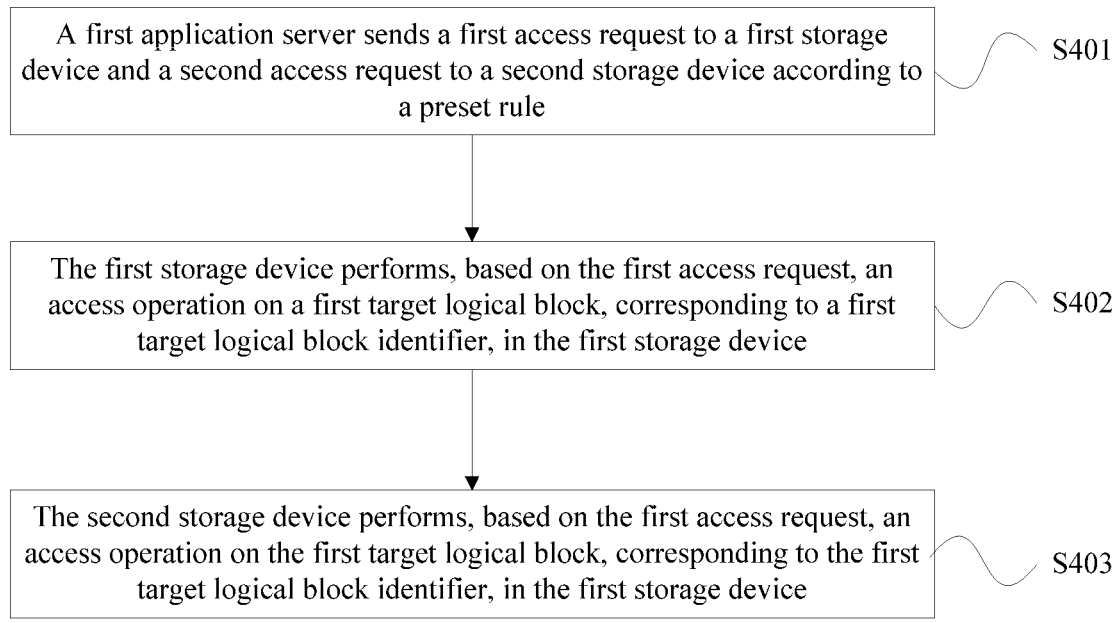
FIG. 4 is a schematic flowchart of still another data access method according to an embodiment of the present invention.

FIG. 4 is a schematic flowchart of still another data access method according to an embodiment of the present invention. In this embodiment, a preset rule is used to instruct at least one routing apparatus to send an access request for performing a write operation or a read operation on a first-type logical block to a first storage device and send an access request for performing a write operation or a read operation on a second-type logical block to a second storage device. This embodiment relates to a specific process of sending, by a first application server, access requests corresponding to different logical blocks in a same logical unit. As shown in FIG. 4, the method may include the following operations.

Operation S401. The first application server sends a first access request to the first storage device and a second access request to the second storage device according to the preset rule.

The first access request carries a first target logical block identifier, and a first target logical block corresponding to the first target logical block identifier is a first-type logical block. The second access request carries a second target logical block identifier, and a second target logical block corresponding to the second target logical block identifier is a second-type logical block.

In one embodiment, the first target logical block and the second target logical block are different logical blocks belonging to a same logical unit. In other words, the first target logical block and the second target logical block are located at different locations of the same logical unit. That is, the first target logical block and the second target logical block have different offsets in the same logical unit. The first target logical block and the second target logical block may be adjacent logical blocks or non-adjacent logical blocks in the same logical unit. In this embodiment, the first target logical block and the second target logical block are different types of logical blocks. For example, the first target logical block is the first-type logical block, and the second target logical block is the second-type logical block; or the first target logical block is the second-type logical block, and the second target logical block is the first-type logical block. In the following example, the first target logical block is the first-type logical block, and the second target logical block is the second-type logical block.

Therefore, when the first application server simultaneously accesses different types of logical blocks in the same logical unit, the first application server may send, according to the preset rule, a first access request corresponding to the first target logical block to the first storage device and a second access request corresponding to the second target logical block to the second storage device, so that the first storage device and the second storage device can simultaneously perform access operations on different logical blocks in the same logical unit. Compared with a prior-art manner in which different storage devices cannot simultaneously perform access operations on logical blocks at different locations in a same logical unit, the data access method provided in this embodiment of the present invention improves efficiency of processing an access request by the storage system.

Operation S402. The first storage device performs, based on the first access request, an access operation on a first target logical block, corresponding to a first target logical block identifier, in the first storage device.

For how the first storage device performs, based on the first access request, the access operation on the first target logical block, corresponding to the first target logical block identifier, in the first storage device, specifically refer to the descriptions in S104. Technical principles and implementation effects thereof are similar to those in S104, and details are not described herein again.

Operation S403. The second storage device performs, based on the first access request, an access operation on the first target logical block, corresponding to the first target logical block identifier, in the first storage device.

For how the second storage device performs, based on a second access request, the access operation on a second target logical block, corresponding to a second target logical block identifier, in the second storage device, specifically refer to the descriptions in S104. Technical principles and implementation effects thereof are similar to those in S104, and details are not described herein again.

According to the data access method provided in this embodiment of the present invention, each logical unit in the storage device is divided into a plurality of logical blocks. When the first application server simultaneously accesses the different types of logical blocks in the same logical unit, the first application server may send, according to the preset rule, the first access request corresponding to the first target logical block to the first storage device and the second access request corresponding to the second target logical block to the second storage device, so that the first storage device and the second storage device can simultaneously perform access operations on different logical blocks in the same logical unit. This improves efficiency of processing the access request by the storage system.

For ease of understanding of this embodiment of the present invention, with reference to several specific examples, the following describes the data access method provided in this embodiment of the present invention.

Figure 5:
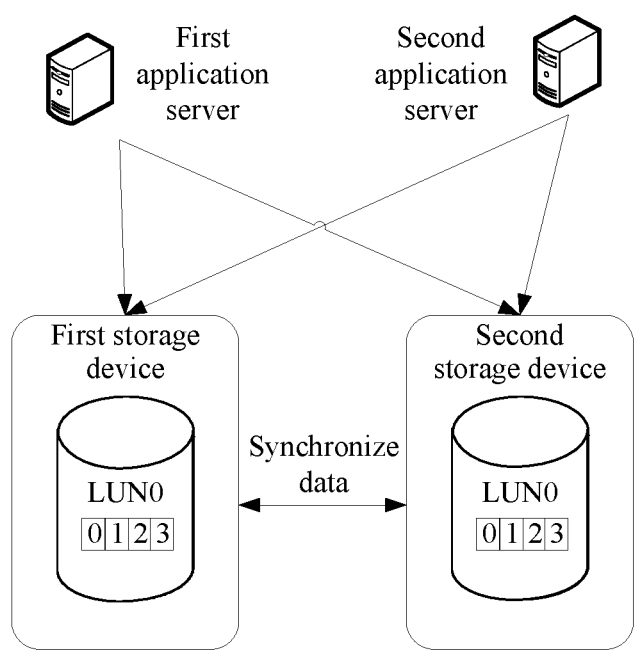
FIG. 5 is a diagram of an application scenario of a data access method according to an embodiment of the present invention.

FIG. 5 is a diagram of an application scenario of a data access method according to an embodiment of the present invention. As shown in FIG. 5, in this example, a storage system includes a first storage device and a second storage device that are in a mutual backup relationship, and at least one application server. Each storage device includes a plurality of LUs. Each LU includes four logical blocks with a same size: a logical block 0, a logical block 1, a logical block 2, and a logical block 3. In the four logical blocks, even-numbered logical blocks (that is, the logical block 0 and the logical block 2) are first-type logical blocks, and odd-numbered logical blocks (that is, the logical block 1 and the logical block 3) are second-type logical blocks. In other words, each LU includes two first-type logical blocks and two second-type logical blocks. FIG. 5 shows an example of a storage system in which LUN0s in the first storage device and the second storage device each include four logical blocks and the at least one application server includes a first application server and a second application server.

A preset rule set on the at least one application server may be sent by the storage device in the storage system to each application server. The preset rule is used to instruct the at least one application server to send an access request for performing a write operation or a read operation on the first-type logical block (that is, an even-numbered logical block) to the first storage device and send an access request for performing a write operation or a read operation on the second-type logical block (that is, an odd-numbered logical block) to the second storage device. The first-type logical block and the second-type logical block are obtained through odd-even division, so that when the application server sends the access request to the first storage device and the access request to the second storage device according to the division rule, a probability of receiving an access request by the first storage device is approximate to a probability of receiving an access request by the second storage device. This ensures load balancing between the first storage device and the second storage device.

Example 1

Figure 6:
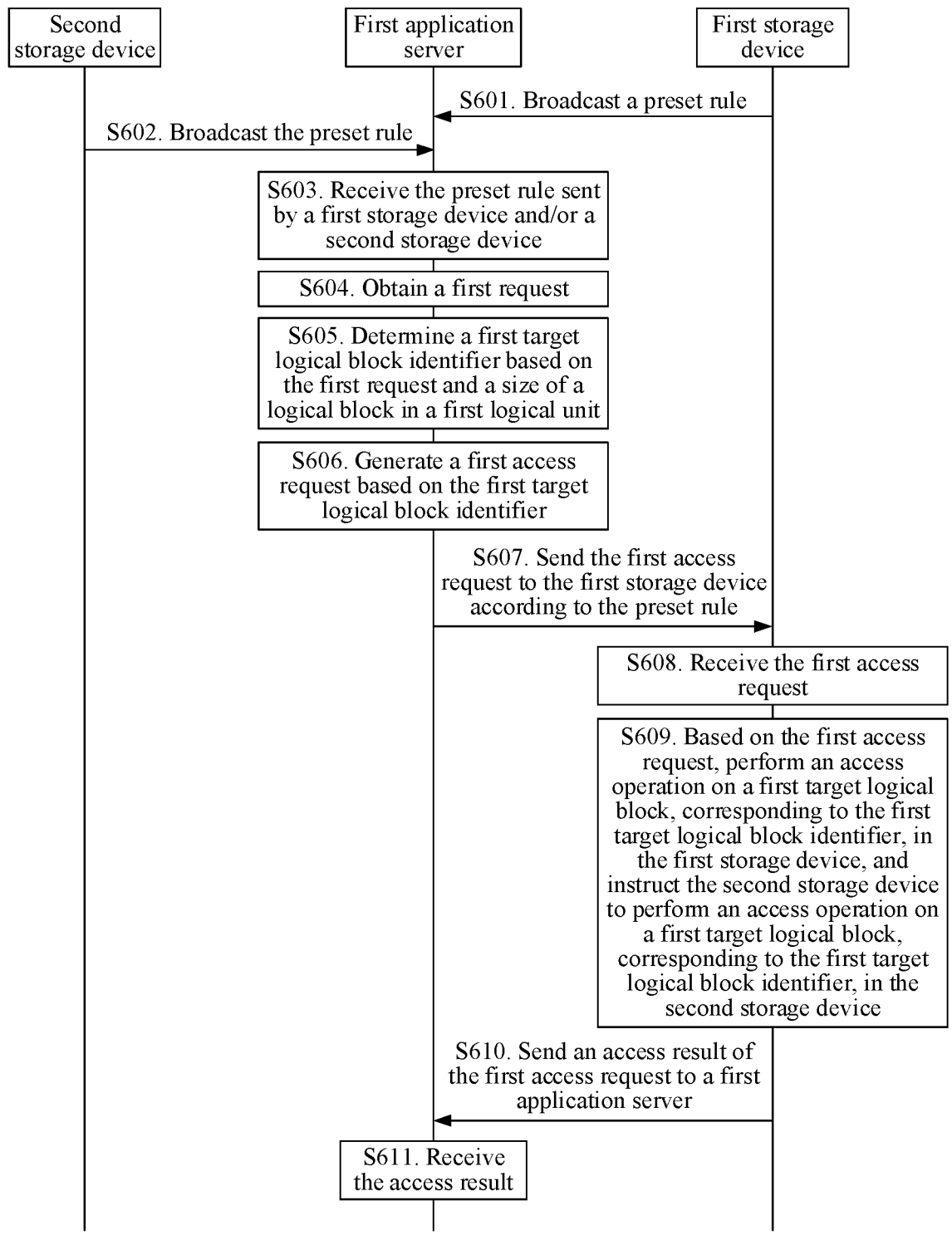
FIG. 6 is a signaling flowchart of another data access method according to an embodiment of the present invention.

For an access request for performing a write operation on one target logical block, for example, the target logical block is a logical block 0 in the LUN0, that is, the logical block 0 in the LUN0 is a first target logical block, and a first target logical block identifier is a first target logical block number. FIG. 6 is a signaling flowchart of another data access method according to an embodiment of the present invention. This embodiment relates to a specific process in which a first application server of at least one application server sends a first access request to a first storage device. As shown in FIG. 6, the method may include the following operations.

Operation S601. The first storage device broadcasts a preset rule.

The preset rule includes a mapping relationship between an address of the first storage device and a logical block number and a mapping relationship between an address of a second storage device and a logical block number. Optionally, the preset rule may further include a size of a logical unit in the storage device and a size of a logical block in the logical unit.

Operation S602. A second storage device broadcasts the preset rule.

For the preset rule broadcast by the second storage device, specifically refer to S601.

Operation S603. The first application server receives the preset rule sent by the first storage device and/or the second storage device.

In one embodiment, after the first application server is powered on, initialized, and is connected to a network, the first application server may receive the preset rule sent by the first storage device and/or the second storage device. During specific implementation, that the first application server specifically receives the preset rule sent by which storage device is related to a distance between the first application server and the storage device in a storage system. Details are not described herein.

In one embodiment, after receiving the preset rule, the first application server may set the preset rule, in a form of a routing table, in the first application server.

TABLE 1

| Routing table |
|---|
| Chunk_id%4=0--->DC0 (111.1.1.1) |
| Chunk_id%4=1--->DC1 (111.2.1.1) |
| Chunk_id%4=2--->DC0 (111.1.1.1) |
| Chunk_id%4=3--->DC1 (111.2.1.1) |

The Chunk_id represents a target logical block identifier (that is, a target logical block number). In this example, the first application server may determine, in a manner of finding a remainder of division of the target logical block identifier by 4, whether the target logical block is a first-type logical block or a second-type logical block. DC0 represents the first storage device, and 111.1.1.1 is the address of the first storage device. DC1 represents the second storage device, and 111.2.1.1 is the address of the second storage device.

Operation S604. The first application server obtains a first request.

For descriptions of this operation, specifically refer to operation S301. Details are not described herein again.

Operation S605. The first application server determines a first target logical block identifier based on the first request and a size of a logical block in a first logical unit.

In one embodiment, the first application server determines, based on the first request and the size of the logical block in the first logical unit, that a to-be-accessed logical block carried in the first request includes one logical block (that is, the logical block 0 in the LUN0), and that the logical block 0 in the LUN0 is the first-type logical block. Therefore, the first application server may directly use the logical block 0 in the LUN0 as the first target logical block identifier.

Operation S606. The first application server generates a first access request based on the first target logical block identifier.

For descriptions of this operation, specifically refer to operation S303. Details are not described herein again.

Operation S607. The first application server sends the first access request to the first storage device according to the preset rule.

In one embodiment, after generating the first access request, with reference to the manner shown in Table 1, the first application server may obtain 0 in a manner of finding a remainder of division of the first target logical block identifier (that is, the logical block 0) by 4, where the first target logical block identifier is indicated by the first access request, and further determine, based on the result 0, that the first target logical block is the first-type logical block. Therefore, based on an IP address corresponding to 0 in the preset rule, the first application server may send the first access request to DC0, that is, the first storage device.

Operation S608. The first storage device receives the first access request.

Operation S609. Based on the first access request, the first storage device performs an access operation on a first target logical block, corresponding to the first target logical block identifier, in the first storage device, and instructs the second storage device to perform an access operation on a first target logical block, corresponding to the first target logical block identifier, in the second storage device.

Operation S610. The first storage device sends an access result of the first access request to the first application server.

Operation S611. The first application server receives the access result of the first access request.

For descriptions of S608 to S611, specifically refer to the descriptions of S202 to S205. Details are not described herein again.

It should be noted that, a operation in which the first application server sends an access request for performing a read operation on the first target logical block is the same as a operation in which the first application server sends an access request for performing a write operation on the first target logical block. Therefore, how the first application server sends the access request for performing the read operation on the first target logical block is not individually described in this embodiment. However, a person skilled in the art may understand that, the first application server can still use the method provided in the example to send the access request for performing the read operation on the first target logical block. Implementation principles and technical effects thereof are similar to those in the example.

Example 2

Figure 7A:
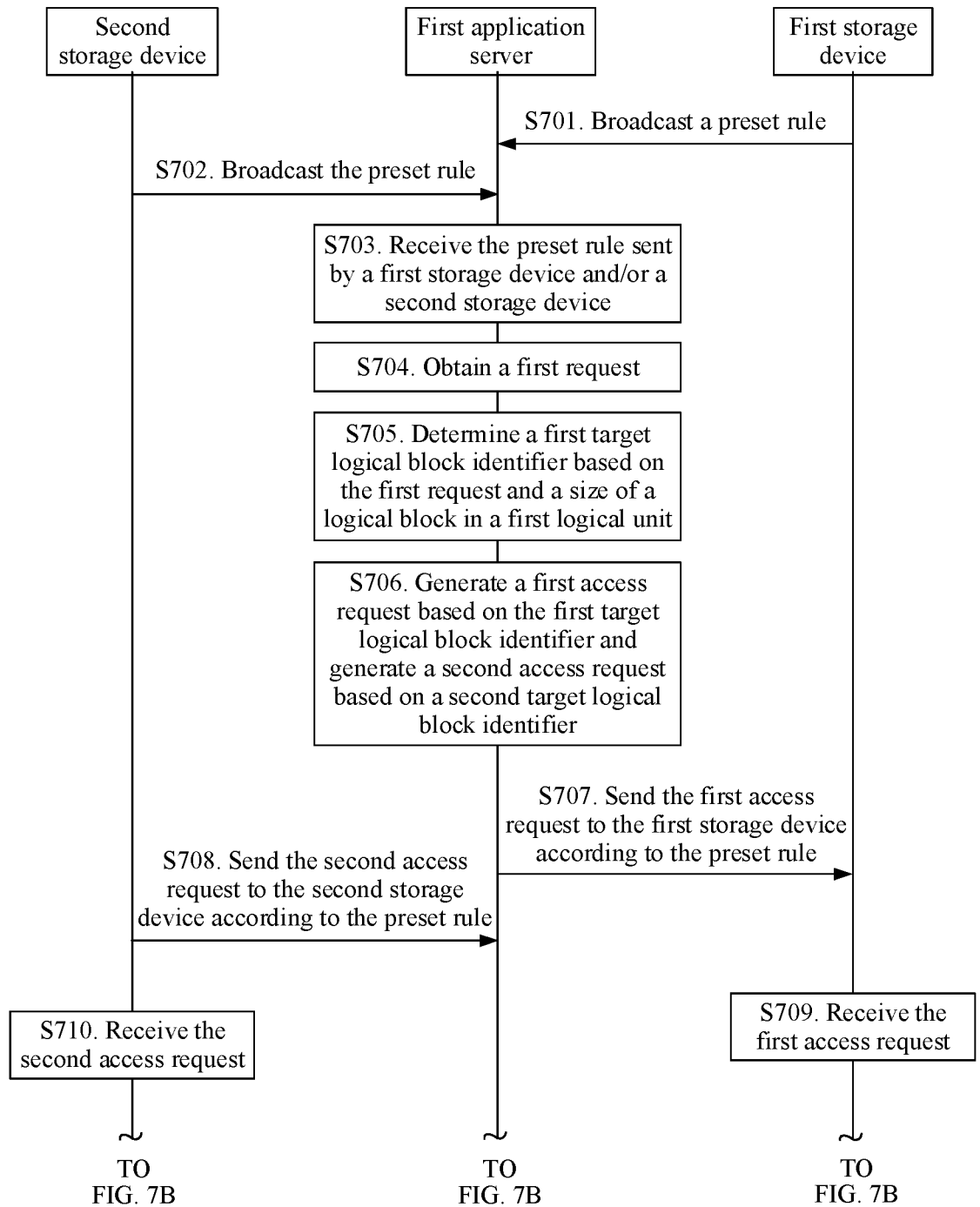
FIG. 7A and FIG. 7B are a signaling flowchart of another data access method according to an embodiment of the present invention.
Figure 7B:
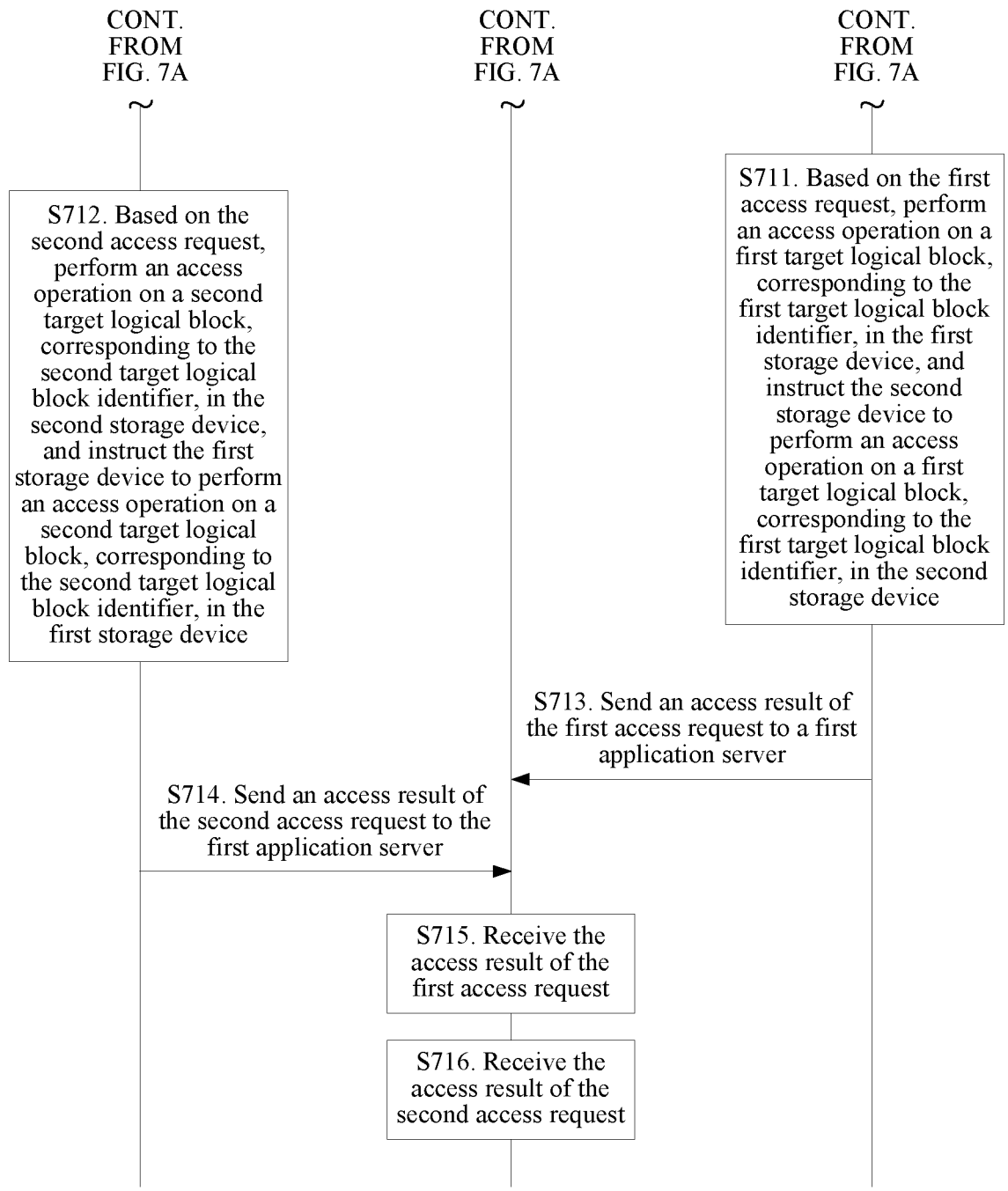

For an access request for performing a write operation on a plurality of target logical blocks, for example, the plurality of target logical blocks are a logical block 0 and a logical block 1 in a LUN0, that is, in the LUN0, the logical block 0 is a first target logical block, the logical block 1 is a second target logical block. A first target logical block identifier is a first target logical block number, and a second target logical block identifier is a second target logical block number. FIG. 7A and FIG. 7B are a signaling flowchart of another data access method according to an embodiment of the present invention. This embodiment relates to a specific process in which a first application server of at least one application server sends a first access request to a first storage device. As shown in FIG. 7A and FIG. 7B, the method may include the following operations.

Operation S701. The first storage device broadcasts a preset rule.

Operation S702. A second storage device broadcasts the preset rule.

Operation S703. The first application server receives the preset rule sent by the first storage device and/or the second storage device.

Operation S704. The first application server obtains a first request.

For descriptions of S701 to S704, refer to the descriptions of S601 to S604. Details are not described herein again.

Operation S705. The first application server determines a first target logical block identifier based on the first request and a size of a logical block in a first logical unit.

In one embodiment, the first application server determines, based on the first request and the size of the logical block in the first logical unit, that a to-be-accessed logical block carried in the first request includes two logical blocks (that is, a logical block 0 and a logical block 1 in the LUN0). The logical block 0 in the LUN0 is the first-type logical block, and the logical block 1 in the LUN0 is the second-type logical block. Therefore, the first application server may use the logical block 0 in the LUN0 as a first target logical block identifier, and use the logical block 1 as a second target logical block identifier.

Operation S706. The first server generates a first access request based on the first target logical block identifier and generates a second access request based on a second target logical block identifier.

In one embodiment, after determining the first target logical block identifier and the second target logical block identifier, the first application server may generate the first access request based on the first target logical block identifier, and generate the second access request based on the second target logical block identifier, that is, divides the first request into the first access request and the second access request, so that the first application server may send the first access request and the second access request to different storage devices for execution. This improves access request execution efficiency of a storage system.

For how the first application server generates the second access request based on the second target logical block identifier, specifically refer to S606 in which the first application server generates the first access request based on the first target logical block identifier. Details are not described herein again.

Operation S707. The first application server sends the first access request to the first storage device according to the preset rule.

In one embodiment, after generating the first access request, with reference to the manner shown in Table 1, the first application server may obtain 0 in a manner of finding a remainder of division of the first target logical block identifier (that is, the logical block 0) by 4, where the first target logical block identifier is indicated by the first access request, and further determine, based on the result 0, that the first target logical block is the first-type logical block. Therefore, based on an IP address corresponding to 0 in the preset rule, the first application server may send the first access request to DC0, that is, the first storage device.

Operation S708. The first application server sends the second access request to the second storage device according to the preset rule.

In one embodiment, after generating the second access request, with reference to the manner shown in Table 1, the first application server may obtain 1 in a manner of finding a remainder of division of the second target logical block identifier (that is, the logical block 1) by 4, where the second target logical block identifier is indicated by the second access request, and further determine, based on the result 1, that the second target logical block is the second-type logical block. Therefore, based on an IP address corresponding to 1 in the preset rule, the first application server may send the second access request to DC1, that is, the second storage device.

Operation S709. The first storage device receives the first access request.

Operation S710. The second storage device receives the second access request.

Operation S711. Based on the first access request, the first storage device performs an access operation on a first target logical block, corresponding to the first target logical block identifier, in the first storage device, and instructs the second storage device to perform an access operation on a first target logical block, corresponding to the first target logical block identifier, in the second storage device.

Operation S712. Based on the second access request, the second storage device performs an access operation on a second target logical block, corresponding to the second target logical block identifier, in the second storage device, and instructs the first storage device to perform an access operation on a second target logical block, corresponding to the second target logical block identifier, in the first storage device.

Operation S713. The first storage device sends an access result of the first access request to the first application server.

Operation S714. The second storage device sends an access result of the second access request to the first application server.

Operation S715. The first application server receives the access result of the first access request.

Operation S716. The first application server receives the access result of the second access request.

An action executed by the second storage device after the second storage device receives the access request is the same as an action executed by the first storage device after the first storage device receives the access request. Therefore, for descriptions of S709 to S716, specifically refer to the descriptions of S202 to S205, and details are not described herein again.

In one embodiment, after receiving the access result of the first access request and the access result of the second access request, the first application server may determine an access result of the first request based on the access result of the first access request and the access result of the second access request. If both the access result of the first access request and the access result of the second access request indicate that the access succeeds, the first application server may determine that the access result of the first request indicates a success. If either of or both the access result of the first access request and the access result of the second access request indicate that the access fails, the first application server may determine that the access result of the first request indicates a failure. In this way, after the first application server sends the access result of the first request to a terminal device that initially requests to perform access, the terminal device may determine, based on the access result, whether to initiate again access to the first target logical block and the second target logical block, thereby improving user experience.

It should be noted that, a operation in which the first application server sends an access request for performing a read operation on the first target logical block is the same as a operation in which the first application server sends an access request for performing a write operation on the first target logical block, and a operation in which the first application server sends an access request for performing a read operation on the second target logical block is the same as a operation in which the first application server sends an access request for performing a write operation on the second target logical block. Therefore, how the first application server sends the access request for performing the read operation on the first target logical block, and how the first application server sends the access request for performing the read operation on the second target logical block are not individually described in this embodiment. However, a person skilled in the art may understand that, the first application server can still use the method provided in the example to send the access request for performing the read operation on the first target logical block and send the access request for performing the write operation on the second target logical block. Implementation principles and technical effects thereof are similar to those in the example.

In one embodiment, based on the example, if the first storage device determines that the second storage device is faulty, the first storage device obtains a new preset rule, and broadcasts the new preset rule to each of the at least one application server. The new preset rule may be used to instruct the at least one application server to send, to the first storage device, an access request for performing a write operation or a read operation on the first-type logical block and an access request for performing a write operation or a read operation on the second-type logical block. In this way, after receiving the new preset rule, any of the at least one application server (including the first application server) may send an access request to the first storage device in the storage system based on the new preset rule. This improves efficiency of processing the access request by the storage system.

A specific implementation of determining, by the first storage device, that the second storage device is faulty is not limited in this embodiment. For example, the first storage device may determine, when being disconnected from the second storage device, that the second storage device is faulty, or may determine, when receiving information, indicating that the second storage device is faulty, sent by a preset quantity of application servers, that the second storage device is faulty. The preset quantity may be set depending on a user's requirement. During specific implementation, the application server may determine, based on whether the application server is disconnected from the second storage device, whether the second storage device is faulty.

In one embodiment, in addition to the first storage device and the second storage device, if the storage system includes another storage device, when determining that the second storage device is faulty, the first storage device may determine, through negotiation with the another storage device, whether to broadcast a new preset rule or the like. The new preset rule may include a mapping relationship between various types of logical blocks and the first storage device and the another storage device, but does not include a mapping relationship between the various types of logical blocks and the second storage device. During negotiation between the first storage device and the another storage device, an access service provided to each application server may be suspended. After negotiation is completed, that is, after the new preset rule is broadcast, the first storage device and the another storage device may send, to each application server, a response message indicating that the access service provided to each application server can be provided properly, so that each application server can send an access request based on the new preset rule. This ensures that all the access requests can be processed correctly, and improves efficiency of processing the access requests by the storage system.

According to the data access method provided in this embodiment of the present invention, the preset rule is set on each application server, so that when sending access requests to the storage devices in the storage system according to the preset rule, each application server sends access requests corresponding to same target logical blocks to one of the storage devices. The one storage device serially processes a plurality of access requests corresponding to the same target logical blocks. Therefore, when no quorum server is configured in the storage system, and the application server sends the access requests to the storage devices in the storage system according to the preset rule, the following problem can be avoided: When the two storage devices simultaneously process access requests, sent by different application servers, for performing a write operation on same logical blocks, data stored in the same logical blocks in the two storage devices is inconsistent, causing inconsistency of data stored on the two storage devices. This reduces network overheads between the storage system and the application server, and improves efficiency of processing the access requests by the storage system.

A person of ordinary skill in the art may understand that all or some of the operations of the method embodiments may be implemented by a program instructing relevant hardware. The program may be stored in a computer readable storage medium. When the program is executed, the operations of the method embodiments are performed. The storage medium includes any medium that can store program code, such as a ROM, a RAM, a magnetic disk, or an optical disc.

Figure 8:
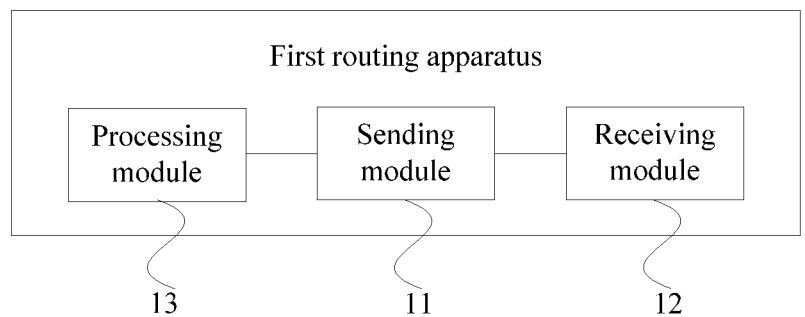
FIG. 8 is a schematic structural diagram of a routing apparatus according to an embodiment of the present invention.

FIG. 8 is a schematic structural diagram of a routing apparatus according to an embodiment of the present invention. The routing apparatus may be applied to a storage system. The storage system includes a first storage device, a second storage device, and at least one routing apparatus. The routing apparatus is a first routing apparatus of the at least one routing apparatus. The second storage device is configured to back up data in the first storage device. Each storage device includes at least one logical unit. Each logical unit includes at least one first-type logical block and at least one second-type logical block. As shown in FIG. 8, the first routing apparatus includes:

a sending module 11, configured to send a first access request to the first storage device according to a preset rule, where the first access request is used to instruct to perform a write operation on a first target logical block corresponding to a first target logical block identifier, the first target logical block corresponding to the first target logical block identifier is the first-type logical block, and the preset rule is used to instruct the at least one routing apparatus to send an access request for performing a write operation on the first-type logical block to the first storage device and send an access request for performing a write operation on the second-type logical block to the second storage device; and a receiving module 12, configured to receive an access result that is sent by the first storage device based on the first access request.

During specific implementation, the routing apparatus may be implemented as a part of or an entirety of an application server or a router by using software, hardware, or a combination thereof. For example, the sending module 11 may be a sender, and the receiving module 12 may be a receiver.

The routing apparatus provided in this embodiment of the present invention may execute the method on the first routing apparatus side in the foregoing method embodiments. Implementation principles and technical effects thereof are similar to those of the method embodiments, and details are not described herein again.

In one embodiment, the preset rule is further used to instruct the at least one routing apparatus to send an access request for performing a read operation on the first-type logical block to the first storage device and send an access request for performing a read operation on the second-type logical block to the second storage device.

In one embodiment, the receiving module 12 is further configured to: before the sending module 11 sends the first access request to the first storage device according to the preset rule, receive the preset rule that is sent by the first storage device and/or the second storage device.

Still referring to FIG. 8, as shown in FIG. 8, in one embodiment, the first routing apparatus may further include:

a processing module 13, configured to: before the sending module 11 sends the first access request to the first storage device according to the preset rule, obtain a first request; determine the first target logical block identifier based on the first request and a size of a logical block in a first logical unit; and generate the first access request based on the first target logical block identifier.

The first request includes an offset and an offset length of a to-be-accessed logical block in the first logical unit, and the to-be-accessed logical block includes the first target logical block.

During specific implementation, the processing module 13 may be a processing component, for example, a processor.

The routing apparatus provided in this embodiment of the present invention may execute the method on the first routing apparatus side in the foregoing method embodiments. Implementation principles and technical effects thereof are similar to those of the method embodiments, and details are not described herein again.

In one embodiment, the receiving module 12 is further configured to receive a new preset rule that is sent by the first storage device after the second storage device is faulty. The new preset rule is used to instruct the at least one routing apparatus to send, to the first storage device, an access request for performing a write operation or a read operation on the first-type logical block and an access request for performing a write operation or a read operation on the second-type logical block.

The routing apparatus provided in this embodiment of the present invention may execute the method on the first routing apparatus side in the foregoing method embodiments. Implementation principles and technical effects thereof are similar to those of the method embodiments, and details are not described herein again.

Figure 9:
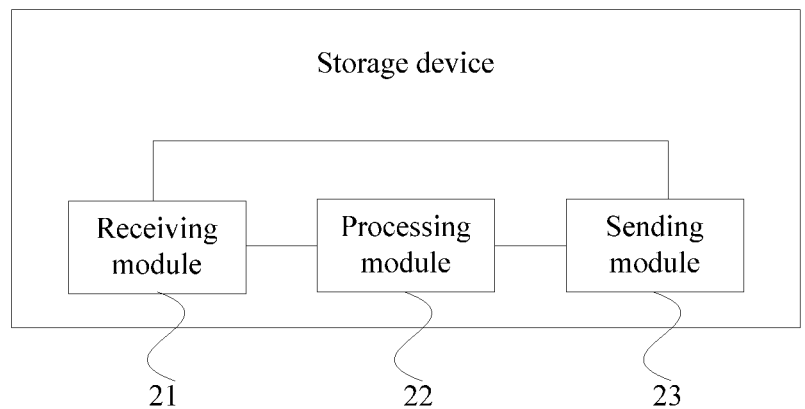
FIG. 9 is a schematic structural diagram of a storage device according to an embodiment of the present invention.

FIG. 9 is a schematic structural diagram of a storage device according to an embodiment of the present invention. The storage device is a first storage device, and a storage system includes the first storage device, a second storage device, and at least one routing apparatus. The second storage device is configured to back up data in the first storage device. Each storage device includes at least one logical unit. Each logical unit includes at least one first-type logical block and at least one second-type logical block. As shown in FIG. 9, the first storage device includes:

a receiving module 21, configured to receive a first access request that is sent by a first routing apparatus of the at least one routing apparatus according to a preset rule, where the first access request is used to instruct to perform a write operation on a first target logical block corresponding to a first target logical block identifier, the first target logical block corresponding to the first target logical block identifier is the first-type logical block, and the preset rule is used to instruct the at least one routing apparatus to send an access request for performing a write operation on the first-type logical block to the first storage device and send an access request for performing a write operation on the second-type logical block to the second storage device; and a processing module 22, configured to: based on the first access request, perform an access operation on the first target logical block, corresponding to the first target logical block identifier, in the first storage device, and instruct the second storage device to perform an access operation on a first target logical block, corresponding to the first target logical block identifier, in the second storage device.

During specific implementation, the receiving module 21 may be a receiver, and the processing module 22 may be a processing component, for example, a processor.

The first storage device provided in this embodiment of the present invention may execute the method on the first storage device side in the foregoing method embodiments. Implementation principles and technical effects thereof are similar to those of the method embodiments, and details are not described herein again.

In one embodiment, the preset rule is further used to instruct the at least one routing apparatus to send an access request for performing a read operation on the first-type logical block to the first storage device and send an access request for performing a read operation on the second-type logical block to the second storage device.

Still referring to FIG. 9, in one embodiment, the first storage device further includes a sending module 23, configured to: before the receiving module 21 receives the first access request that is sent by the first routing apparatus of the at least one routing apparatus according to the preset rule, broadcast the preset rule to the at least one routing apparatus. During specific implementation, the sending module 23 may be a sender or the like.

The first storage device provided in this embodiment of the present invention may execute the method on the first storage device side in the foregoing method embodiments. Implementation principles and technical effects thereof are similar to those of the method embodiments, and details are not described herein again.

In one embodiment, the processing module 22 is further configured to determine that the second storage device is faulty, and obtain a new preset rule, where the new preset rule is used to instruct the at least one routing apparatus to send, to the first storage device, an access request for performing a write operation or a read operation on the first-type logical block and an access request for performing a write operation or a read operation on the second-type logical block; and the sending module 23 is further configured to broadcast the new preset rule to the at least one routing apparatus.

The first storage device provided in this embodiment of the present invention may execute the method on the first storage device side in the foregoing method embodiments. Implementation principles and technical effects thereof are similar to those of the method embodiments, and details are not described herein again.

Figure 10:
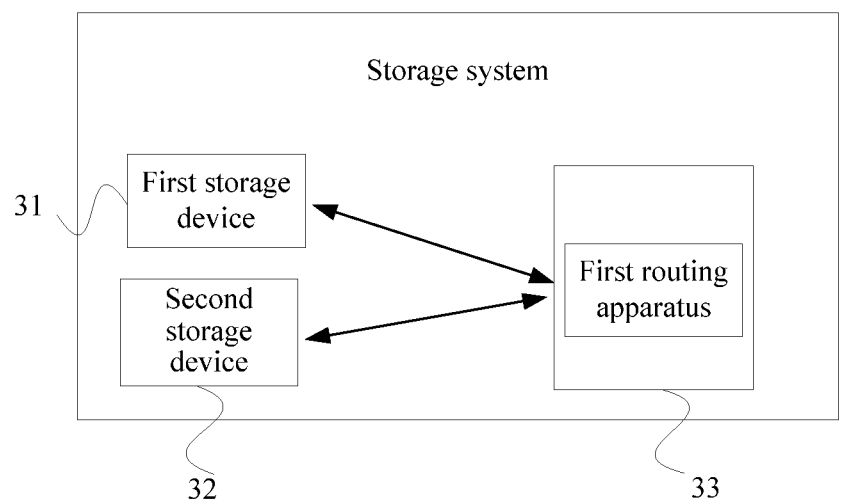
FIG. 10 is a schematic structural diagram of a storage system according to an embodiment of the present invention.

FIG. 10 is a schematic structural diagram of a storage system according to an embodiment of the present invention. As shown in FIG. 10, the storage system includes a first storage device 31, a second storage device 32, and at least one routing apparatus 33. The at least one routing apparatus includes a first routing apparatus 34. The first storage device 31 and the second storage device 32 are in a mutual backup relationship. Each storage device includes at least one logical unit. Each logical unit includes at least one first-type logical block and at least one second-type logical block.

The first routing apparatus 34 is configured to send, according to a preset rule, a first access request to the first storage device 31 and a second access request to the second storage device 32. The first access request carries a first target logical block identifier, and a first target logical block corresponding to the first target logical block identifier is the first-type logical block. The second access request carries a second target logical block identifier, and a second target logical block corresponding to the second target logical block identifier is the second-type logical block. The preset rule is used to instruct the at least one routing apparatus 33 to send an access request for performing a write operation or a read operation on the first-type logical block to the first storage device 31 and send an access request for performing a write operation or a read operation on the second-type logical block to the second storage device 32.

The first storage device 31 is configured to perform, based on the first access request, an access operation on the first target logical block, corresponding to the first target logical block identifier, in the first storage device 31.

The second storage device 32 is configured to perform, based on the second access request, an access operation on the second target logical block, corresponding to the second target logical block identifier, in the second storage device 32.

The first target logical block corresponding to the first target logical block identifier and the second target logical block corresponding to the second target logical block identifier belong to a same logical unit.

The storage system provided in this embodiment of the present invention may execute the foregoing method embodiments, implementation principles and technical effects thereof are similar to those in the method embodiments, and details are not described herein again.

In one embodiment, the first routing apparatus 34 is further configured to: before sending the first access request to the first storage device 31 and the second access request to the second storage device 32 according to the preset rule, receive the preset rule that is sent by the first storage device 31 and/or the second storage device 32.

In one embodiment, the first routing apparatus 34 is further configured to: before sending the first access request to the first storage device 31 and the second access request to the second storage device 32 according to the preset rule, obtain a first request; determine the first target logical block identifier and the second target logical block identifier based on the first request and a size of a logical block in a first logical unit; and generate the first access request based on the first target logical block identifier and the second access request based on the second target logical block identifier.

The first request includes an offset and an offset length of a to-be-accessed logical block in the first logical unit, and the to-be-accessed logical block includes the first target logical block and the second target logical block.

In one embodiment, the first routing apparatus 34 is further configured to: receive an access result that is sent by the first storage device 31 based on the first access request and an access result that is sent by the second storage device 32 based on the second access request; and determine an access result of the first request based on the access result corresponding to the first access request and the access result corresponding to the second access request.

In one embodiment, the first routing apparatus 34 is further configured to receive a new preset rule that is sent by the first storage device 31 after the second storage device 32 is faulty. The new preset rule is used to instruct the at least one routing apparatus to send, to the first storage device 31, an access request for performing a write operation or a read operation on the first-type logical block and an access request for performing a write operation or a read operation on the second-type logical block.

The storage system provided in the embodiments of the present invention may execute the foregoing method embodiments, implementation principles and technical effects thereof are similar to those in the method embodiments, and details are not described herein again.

What is claimed is:

1. A data access method, comprising:
receiving, by a first application server, a preset rule that is sent by a first storage device and/or a second storage device, wherein the preset rule is used to instruct the first application server to send an access request for performing a write operation on a first-type logical block to the first storage device and send an access request for performing a write operation on a second-type logical block to the second storage device, wherein the second storage device is configured to back up data in the first storage device;
sending, by the first application server, a first access request to the first storage device and a second access request to the second storage device according to the preset rule, wherein the first storage device comprises at least one first-type logical block and at least one second-type logical block, wherein the first access request is used to instruct to perform a first write operation on a first target logical block corresponding to a first target logical block identifier, the first target logical block belongs to the first-type logical block, and wherein the second access request is used to instruct to perform a second write operation on a second target logical block corresponding to a second target logical block identifier, the second target logical block belongs to the second-type logical block;
receiving, by the first application server, a first access result that is sent by the first storage device indicating whether the first write operation was performed successful or not successful; and
receiving, by the first application server, a second access result that is sent by the second storage device indicating whether the second write operation was performed successful or not successful.

2. The method according to claim 1, wherein before the sending, by a first application server, a first access request to the first storage device according to a preset rule, the method further comprises:
obtaining, by the first application server, a first request, wherein the first request comprises an offset and an offset length of a to-be-accessed logical block in a first logical unit, and the to-be-accessed logical block comprises the first target logical block;

determining, by the first application server, the first target logical block identifier based on the first request and a size of a logical block in the first logical unit; and
generating, by the first application server, the first access request based on the first target logical block identifier.

3. The method according to claim 1, wherein the preset rule is further used to instruct the first application server to send an access request for performing a read operation on the first-type logical block to the first storage device and send an access request for performing a read operation on the second-type logical block to the second storage device.

4. The method according to claim 1, further comprising:
receiving, by the first application server, a new preset rule that is sent by the first storage device after the second storage device is faulty, wherein the new preset rule is used to instruct the first application server to send, to the first storage device, an access request for performing a write operation or a read operation on the first-type logical block and an access request for performing a write operation or a read operation on the second-type logical block.

5. A data access method, comprising:
receiving, by a first application server, a preset rule that is sent by a first storage device and/or a second storage device, wherein the preset rule is used to instruct the first application server to send an access request for performing a write operation or a read operation on a first-type logical block to the first storage device and send an access request for performing a write operation or a read operation on a second-type logical block to the second storage device, wherein the second storage device is configured to back up data in the first storage device;
sending, by the first application server, a first access request to the first storage device and a second access request to the second storage device according to the preset rule, each storage device comprises at least one first-type logical block and at least one second-type logical block, wherein the first access request carries a first target logical block identifier, a first target logical block corresponding to the first target logical block identifier belongs to the first-type logical block, the second access request carries a second target logical block identifier, a second target logical block corresponding to the second target logical block identifier belongs to the second-type logical block;
performing, by the first storage device based on the first access request, an access operation on the first target logical block in a first logical unit of the first storage device;
performing, by the second storage device based on the second access request, an access operation on the second target logical block in a second logical unit of the second storage device;
wherein data stored in the first logical unit and data stored in a second logical unit are the same.

6. The method according to claim 5, wherein before the sending, by a first application server, a first access request to the first storage device and a second access request to the second storage device according to a preset rule, the method further comprises:
obtaining, by the first application server, a first request, wherein the first request comprises an offset and an offset length of a to-be-accessed logical block in a first logical unit, and the to-be-accessed logical block comprises the first target logical block and the second target logical block;

determining, by the first application server, the first target logical block identifier and the second target logical block identifier based on the first request and a size of a logical block in the first logical unit; and generating, by the first application server, the first access request based on the first target logical block identifier and the second access request based on the second target logical block identifier.

7. The method according to claim 5, further comprising:

receiving, by the first application server, a new preset rule that is sent by the first storage device after the second storage device is faulty, wherein the new preset rule is used to instruct the first application server to send, to the first storage device, an access request for performing a write operation or a read operation on the first-type logical block and an access request for performing a write operation or a read operation on the second-type logical block.

8. A storage system, comprising:

a first storage device and a second storage device, wherein each of the first storage device and the second storage device comprises at least one logical unit, each logical unit comprises at least one first-type logical block and at least one second-type logical block, and wherein the second storage device is configured to back up data in the first storage device;

a first application server coupled to the first storage device and the second storage device and configured to:

receive a preset rule that is sent by the first storage device and/or the second storage device, wherein the preset rule is used to instruct the first application server to send an access request for performing a write operation or a read operation on a first-type logical block to the first storage device and send an access request for performing a write operation or a read operation on a second-type logical block to the second storage device;

send a first access request to the first storage device and a second access request to the second storage device according to the preset rule, wherein the first access request carries a first target logical block identifier, a first target logical block corresponding to the first target logical block identifier belongs to the first-type logical block, the second access request carries a second target logical block identifier, a second target logical block corresponding to the second target logical block identifier belongs to the second-type logical block;

the first storage device is configured to perform, based on the first access request, an access operation on the first target logical block in a first logical unit of the first storage device; and the second storage device is configured to perform, based on the second access request, an access operation on the second target logical block in a second logical unit of the second storage device, wherein data stored in the first logical unit and data stored in a second logical unit are the same.

9. The storage system according to claim 8, wherein the first application server is further configured to: before sending the first access request to the first storage device and the second access request to the second storage device according to the preset rule, obtain a first request; determine the first target logical block identifier and the second target logical block identifier based on the first request and a size of a logical block in a first logical unit; and generate the first access request based on the first target logical block identifier and the second access request based on the second target logical block identifier, wherein the first request comprises an offset and an offset length of a to-be-accessed logical block in the first logical unit, and the to-be-accessed logical block comprises the first target logical block and the second target logical block.

10. The storage system according to claim 8, wherein the first application server is further configured to receive a new preset rule that is sent by the first storage device after the second storage device is faulty, wherein the new preset rule is used to instruct the first application server to send, to the first storage device, an access request for performing a write operation or a read operation on the first-type logical block and an access request for performing a write operation or a read operation on the second-type logical block.

* * * * *